(12) United States Patent
Bartol, Jr.

(10) Patent No.: US 10,923,960 B1
(45) Date of Patent: Feb. 16, 2021

(54) RESONANT FREQUENCY POWER GENERATOR

(71) Applicant: Robert J. Bartol, Jr., Boise, ID (US)

(72) Inventor: Robert J. Bartol, Jr., Boise, ID (US)

( * ) Notice: Subject to any disclaimer, the term of this patent is extended or adjusted under 35 U.S.C. 154(b) by 0 days.

(21) Appl. No.: 16/700,559

(22) Filed: Dec. 2, 2019

Related U.S. Application Data

(63) Continuation-in-part of application No. 16/505,242, filed on Jul. 8, 2019, now Pat. No. 10,498,173.

(51) Int. Cl.
| | |
|---|---|
| *H02J 50/12* | (2016.01) |
| *H02K 7/18* | (2006.01) |
| *H04R 1/02* | (2006.01) |
| *H02J 50/15* | (2016.01) |

(52) U.S. Cl.
CPC ............. *H02J 50/12* (2016.02); *H02J 50/15* (2016.02); *H02K 7/1876* (2013.01); *H04R 1/02* (2013.01)

(58) Field of Classification Search
CPC ........ H02J 50/12; H02J 50/15; H02K 7/1876; H04R 1/02
See application file for complete search history.

(56) References Cited

U.S. PATENT DOCUMENTS

2014/0219494 A1   8/2014   Kim

*Primary Examiner* — Hal Kaplan
(74) *Attorney, Agent, or Firm* — Adam R. Stephenson, Ltd.

(57) ABSTRACT

A resonant frequency power generator is disclosed. Specific implementations include a base, a magnet suspended within the base through one or more flexible connectors, and a coil disposed around the magnet. The magnet and one or more flexible connectors may be configured to vibrate at a resonant frequency emitted by a speaker, and the vibration of the magnet may generate electrical power with the coil.

20 Claims, 5 Drawing Sheets

RESONANT FREQUENCY POWER GENERATOR

CROSS REFERENCE TO RELATED APPLICATIONS

This application is a continuation-in-part application of the earlier U.S. Utility Patent Application to Robert J. Bartol, Jr. entitled "Resonant Frequency Power Generator," application Ser. No. 16/505,242, filed Jul. 8, 2019, now pending, the disclosure of which is hereby incorporated entirely herein by reference.

BACKGROUND

1. Technical Field

Aspects of this document relate generally to power generation. More specific implementations involve the use of frequency generators and oscillators in power generation.

2. Background

Sound energy is transported as a compression wave through a medium. In some situations, the medium is air; in others, the medium may be a solid or liquid material, or it may be a magnetic field.

SUMMARY

Implementations of a power generator may include: a base, a magnet suspended within the base through one or more flexible connectors, and a coil disposed around the magnet. The magnet and one or more flexible connectors may be configured to vibrate under the influence of a magnetic field generated by a speaker coil, and the vibration of the magnet may generate electrical power with the coil.

Implementations of the power generator may include one, all, or any of the following:

The magnet may include a bar magnet.

A Faraday cage may enclose at least the power generator.

At least one battery may be electrically connected to the power generator.

The magnetic field lines of the magnetic field may be oriented linearly or toroidally.

The one or more flexible connectors also include rubber, a spring, or an elastic material.

The magnetic field may include a time varying magnetic field.

Implementations of a power generator system may include: a frequency oscillator electrically connected to a transmitter which may be configured to send a frequency of the frequency oscillator to a satellite over a telecommunications channel, a receiver which may be configured to receive the frequency over the telecommunications channel from the satellite, and a speaker connected with the receiver. The speaker may be driven by the frequency to produce a time varying magnetic field corresponding with the frequency. A plurality of resonant frequency generators may be configured to vibrate at a frequency under the influence of the time varying magnetic field from the speaker. The plurality of resonant frequency generators may be configured to generate an output voltage through the vibration.

Implementations of the power generator may include one, all, or any of the following:

A Faraday cage may enclose at least the power generator.

At least one battery may be electrically connected to the power generator.

The time varying magnetic field may be oriented linearly or toroidally.

The power generator system may further include one or more resonant frequency generators configured to generate an input voltage using a compression wave generated by the speaker.

Implementations of a power generator system may include: a first base and a second base, a first magnet coupled to the first base through one or more flexible connectors, and a second magnet coupled to the second base through one or more flexible connectors. A first coil may be included disposed around the first magnet and a second coil may be disposed around a second magnet. The first magnet and the one or more flexible connectors may be configured to vibrate at a resonant frequency emitted by a noise source. The second magnet and the one or more flexible connectors may be configured to vibrate under the influence of a magnetic field generated by a speaker coil. The vibration of the first magnet may generate electrical power with the first coil and the vibration of the second magnet may generate electrical power with the second coil.

Implementations of the power generator may include one, all, or any of the following:

The first magnet and the second magnet may each include a bar magnet.

A Faraday cage may enclose at least the power generator system.

At least one battery may be electrically connected to the power generator system.

The magnetic field lines of the magnetic field may be oriented linearly or toroidally.

The one or more flexible connectors may also include rubber, a spring, or an elastic material.

The magnetic field may include a time varying magnetic field.

The noise source may include the speaker coil.

The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

Implementations will hereinafter be described in conjunction with the appended drawings, where like designations denote like elements, and.

DESCRIPTION

This disclosure, its aspects and implementations, are not limited to the specific components, assembly procedures or method elements disclosed herein. Many additional components, assembly procedures and/or method elements known in the art consistent with the intended resonant frequency power generators will become apparent for use with particular implementations from this disclosure. Accordingly, for example, although particular implementations are disclosed, such implementations and implementing components may comprise any shape, size, style, type, model, version, measurement, concentration, material, quantity, method element, step, and/or the like as is known in the art for such resonant frequency power generators, and implementing components and methods, consistent with the intended operation and methods.

An oscillator may be used to generate a sound wave or other compression wave at a frequency tuned to cause an object to vibrate when the resonant frequency of that object is reached. In various implementations disclosed in this document, a permanent (or electromagnet) magnet is designed vibrate with a particular resonant frequency of the magnet system is reached under the influence of a sound or other compression wave. In various implementations, using at least one oscillator to assist in generating the sound or other compression wave, a magnet inside a resonant frequency power generator vibrates and the vibration is used to generate a voltage output. In various implementations, one oscillator may be used in the process of generating a sound wave or other compression wave that activates, or interacts with, multiple resonant frequency power generators that lie within the effective range of the sound or other compression wave. The voltage output from the one or more resonant frequency power generators may then be fed back to the oscillator to power the oscillator, or may be fed to a load or an energy storage device. In various implementations, there does not need to be a physical or electrical connection between the oscillator and the resonant frequency power generator as the energy to drive the resonant frequency power generator is conveyed through the sound or other compression wave generated by a speaker or other device driven by the oscillator. As such, one variable frequency oscillator is able to generate a sound or compression wave at a given frequency to one or more resonant frequency generators via the speaker or other compression wave generating device without creating a direct electrical load on the oscillator.

Figure 1:
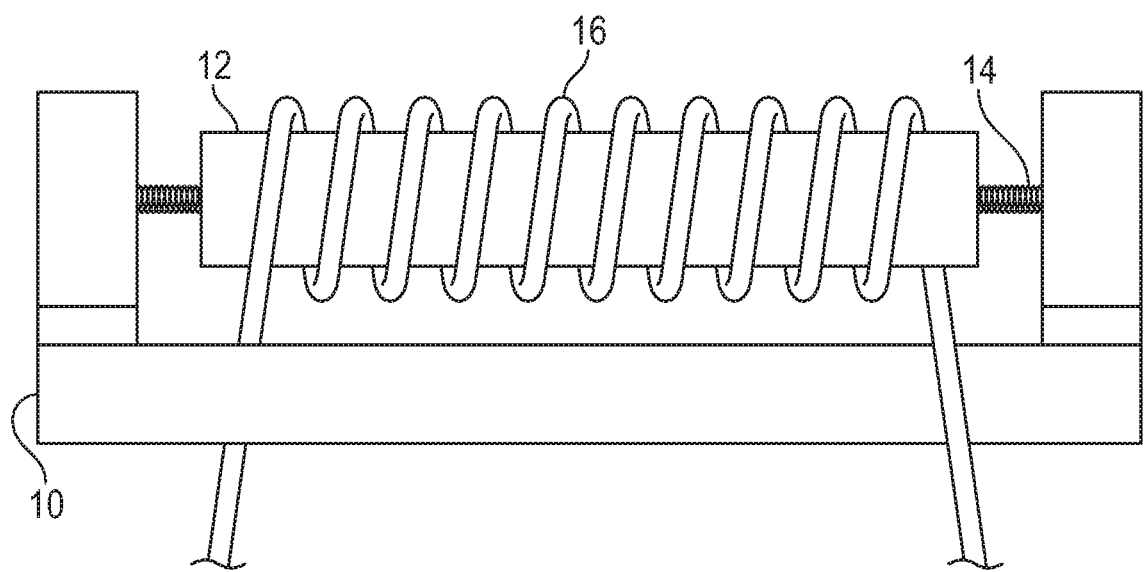
FIG. 1 illustrates an implementation of a power generator with a magnet and flexible connectors.

Referring now to FIG. 1, an implementation of a resonant frequency power generator with a magnet and flexible connectors is illustrated. As illustrated, a magnet 12 is suspended within a base 10 by one or more flexible connectors 14. In various implementations, the magnet 12 may be a bar magnet or a rod magnet. In other various implementations, by non-limiting example, the magnet 12 may be a permanent artificial, temporary artificial, or natural magnet. The magnet 12 may be made from materials such as, by non-limiting example, neodymium iron boron (NdFeB), samarium cobalt (SmCo), alnico, ceramics, ferrites, or any other magnetic or magnetizable material. In various implementations, as illustrated, the base 10 may include a horizontal portion with one or more protrusions or columns extending away from, or upward from, the base 10. In such implementations, the flexible connectors 14 couple with the column(s) of the base 10. In other various implementations, the flexible connectors 14 may be made of, by non-limiting example, rubbers, a spring, a reversibly elastic material, or any other material that allows for the free movement or vibration of the magnet 12. The flexible connectors 14 may both be made of the same material or may be made of different materials in various implementations.

In various implementations, the vibration of the magnet 12 generates electrical power using a coil 16. As illustrated, the coil 16 may be disposed, or wrapped/wound, around the magnet 12. In various implementations, in each resonant frequency power generator, the coil 16, made of an electrically conductive material, is disposed around the magnet 12. In various implementations, the coil 16 is placed with sufficient space between the coil 16 and the magnet 12 to allow for movement of the magnet 12 when the resonant frequency of the magnet+flexible connector(s) system is reached by sound or other compression waves around the system causing the magnet 12 to vibrate. In various implementations, the coil 16 does not come into direct physical contact with the magnet so as to avoid affecting the resonant frequency of the system and reduce energy losses.

Figure 2:
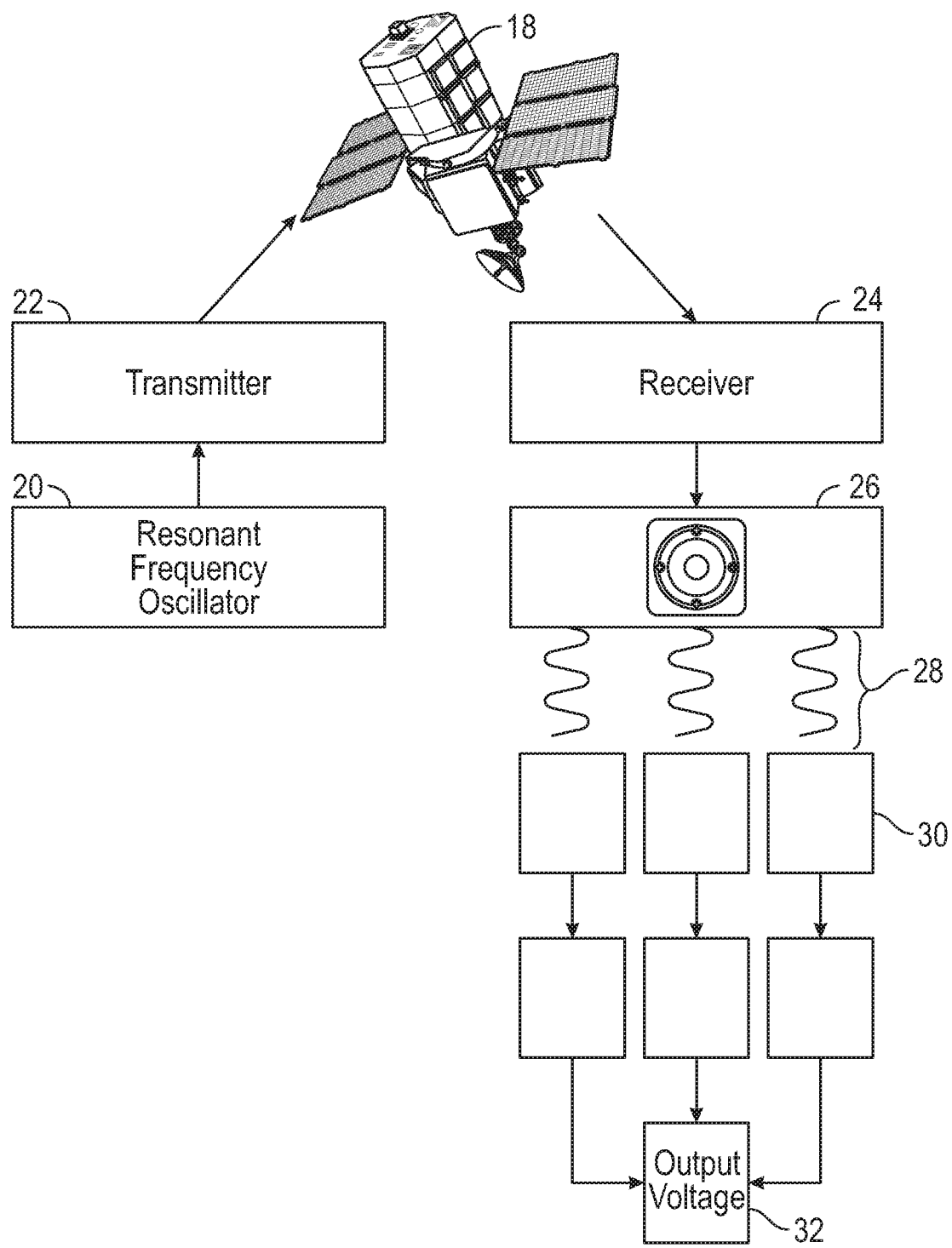
FIG. 2 illustrates an implementation of a power generator with a plurality of resonant frequency generators.

Referring to FIG. 2, an implementation of a resonant frequency power generator system with a plurality of resonant frequency generators is illustrated. As illustrated, a resonant frequency oscillator 20 may be electrically coupled to a transmitter 22. In various implementations, the transmitter 22 sends the frequency, produced by the resonant frequency oscillator, to a satellite 18 or other frequency receiving/transmitting device over a telecommunications channel. As illustrated, a receiver 24 receives the frequency over the telecommunications channel from the satellite 18. As illustrated, a speaker 26 is coupled with the receiver 24. In various implementations, the speaker 26 is designed to take the frequency provided by the receiver and produce sound waves 28 corresponding with the frequency (be driven by the frequency). In such implementations, by non-limiting example, the sound waves 28 may include longitudinal waves or transverse waves. In various other implementations, the waves may be compression waves. In various other implementations, a magnetic field may be produced by a magnetic field generating system, such as, by non-limiting example, an electromagnet, an alternator, a generator, or any other system which creates a time-varying magnetic field, which causes the magnetic component of a resonant frequency generator to oscillate in response to receiving the time-varying magnetic field emitted. In various implementations, the resonant frequency emitted by the speaker 26 may include audible frequencies. In various implementations, the sound or other compression waves may have frequencies within a range of about 20 Hz to about 20,000 Hz. In still other various implementations, the resonant frequency may be induced by a time-varying magnetic field.

As illustrated, a plurality of resonant frequency generators 30 are placed in range of the sound waves 28 from the speaker 26 and designed to vibrate resonantly the frequency of the sound waves produced by the speaker 26. In various implementations, the plurality of resonant frequency generators 30 are designed with coils or other voltage pick up devices which generate an output voltage 32 through the vibration. The output voltage 32 may be further processed using a power converter/inverter/rectifier and may be used directly to power a load or may be stored in a battery.

While in FIG. 2, the use of an electrical resonant frequency oscillator to generate the sound or compression wave used to drive the movement of the resonant frequency generators is illustrated, in other various implementations, by non-limiting example, no oscillator may be used. Instead, a noise source may replace the speaker 26 and may include, by non-limiting example, a variable frequency motor, a jet engine, or any other white noise source with a consistent frequency that can be used as a resonant frequency.

Figure 3:
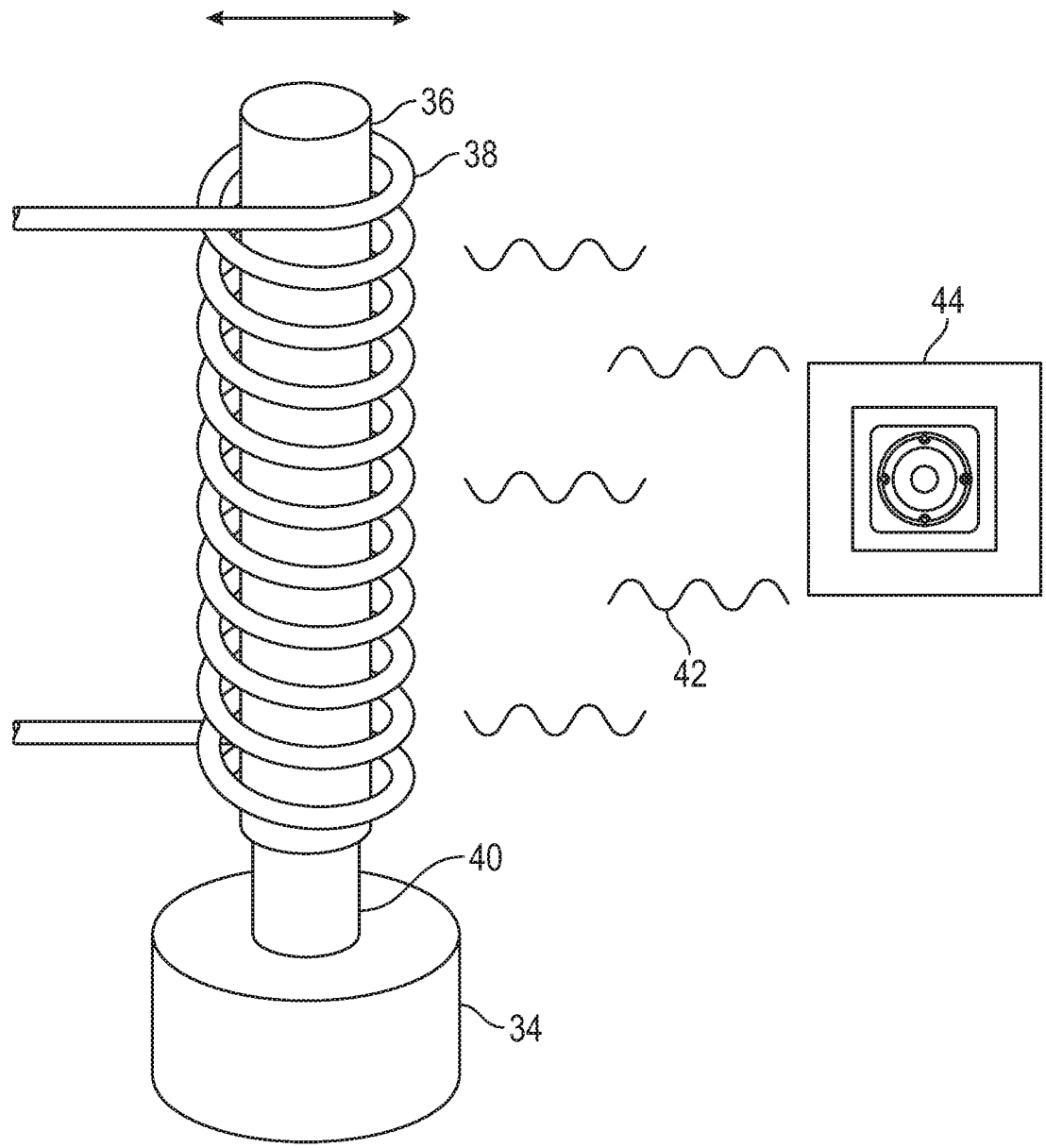
FIG. 3 illustrates an implementation of a power generator with a magnet and one flexible connector.

Referring to FIG. 3, an implementation of a power generator with a magnet and one flexible connector is illustrated. As illustrated, a magnet 36 is mounted on a base 34 using a flexible connector 40. In various implementations, the magnet 36 may be joined with the base 34 at one end. In various implementations, by non-limiting example, the flexible connector 40 may be any of the material types disclosed in this document. In particular implementations, a rubber section or other flexible material that allows for regular movement of the magnet 36 may be used. As illustrated, a coil 38 is disposed on, or wrapped around, the magnet 36 which is made of an electrically conductive material. Like those systems previously described, sound waves 42 at a resonant frequency of the magnet+flexible connector system are produced by speaker 44 and interact with the magnet 36 causing it to vibrate at a resonant frequency. As in previously described implementations, the speaker 44 may be driven by a frequency created by a resonant frequency oscillator directly or via a transmitted signal over a telecommunication channel.

In various implementations, by non-limiting example, the sound waves 42 may include longitudinal waves or transverse waves. In other various implementations, the sound waves emitted by the speaker 44 be an auditory frequency. In various other implementations, the sound waves may be within a range of about 20 Hz to about 20,000 Hz. In other various implementations, as previously described, no frequency oscillator may be used but a noise source like any disclosed in this document may replace the speaker 44. As with other implementations disclosed in this document, the vibration of the magnet 36 is used to generate electrical power in combination with the coil 38 as the moving magnetic field lines of the magnet induce corresponding electrical current in the material of the coil 38.

Figure 4:
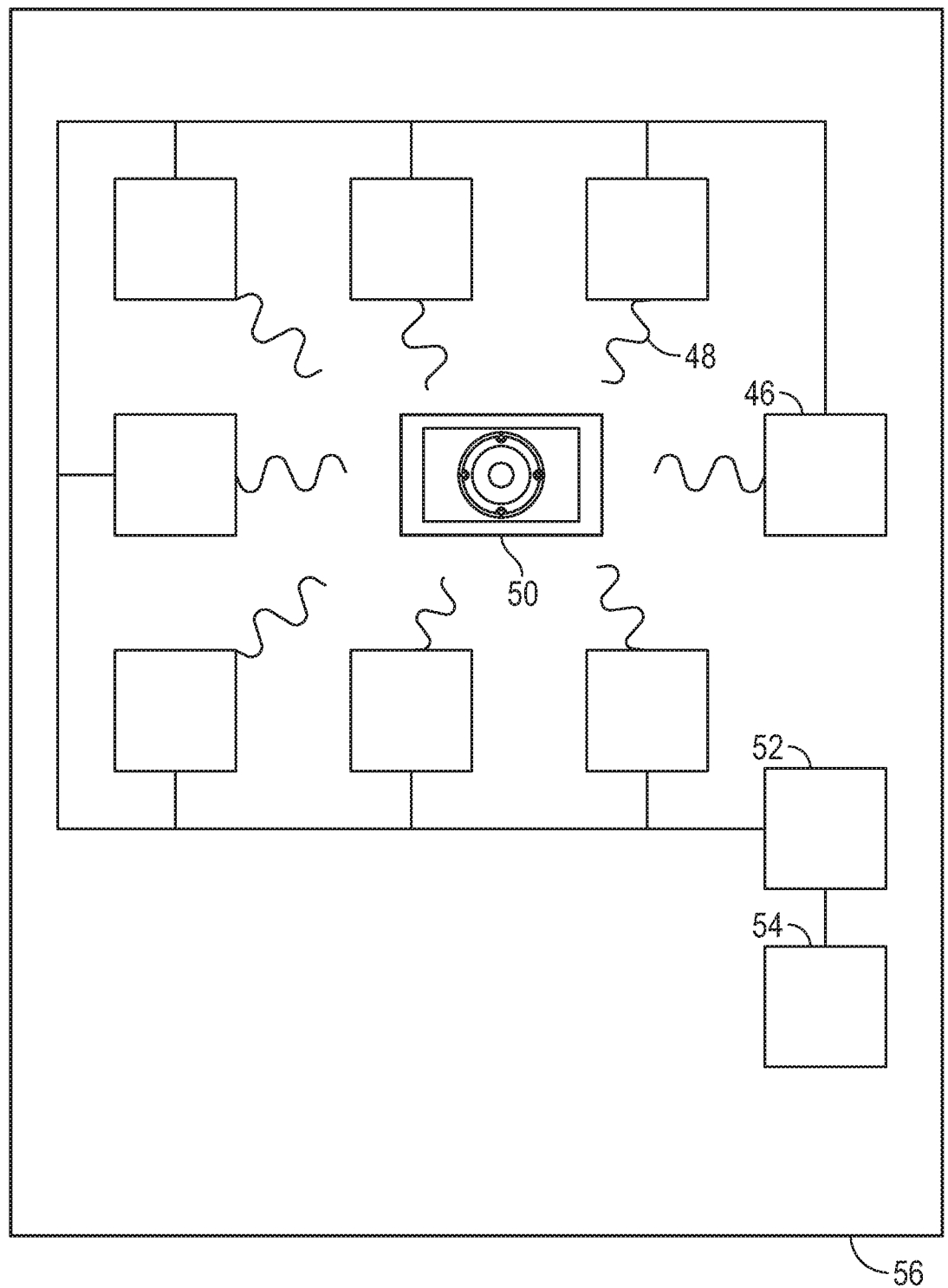
FIG. 4 illustrates an implementation of a power generator with a plurality of resonant frequency generators enclosed within a Faraday cage.

Referring to FIG. 4, an implementation of a power generator with a plurality of resonant frequency generators enclosed within a Faraday cage is illustrated. As illustrated, a plurality of resonant frequency generators 46 are electrically coupled to one another and to a power converter/inverter 52, which is coupled to a battery 54. In other various implementations, each power generator may be serially or in parallel coupled to the battery 54. As illustrated, in various implementations, sound waves 48 are produced by speaker 50 and interact with the resonant frequency generators 46. In such implementations, by non-limiting example, the sound waves 48 may include longitudinal waves or transverse waves. In other various implementations, the sound waves 48 emitted by the speaker 50 may include an auditory frequency; in various implementations, the sound waves may be within a range of 20 Hz to 20,000 Hz. In other various implementations as previously described, a noise source like any disclosed in this document may replace the speaker 50. As illustrated, the system may be enclosed within a Faraday cage 56. In various implementations, the system may be enclosed by a Faraday cage. In such implementations, the Faraday cage may prevent electrical or electromagnetic noise/fields from entering or affecting the system. In various implementations, the Faraday cage may enclose a power generator and a variable frequency oscillator, among other components. In various implementations, a ground pin/connector of an electrical outlet, such as those found in a house or other building, may be coupled to the Faraday cage. In various implementations, the Faraday cage 56 may be sized to include a room in which the power generators are placed. In other implementations, the Faraday cage 56 may be sized just to enclose the power generators themselves.

In various implementations, different resonant frequencies may exist for magnets of different sizes. Differently sized power generators may be used in combination with each other with different resonant frequencies and may be driven using sound or other compression waves (or magnetic waves) from the same noise source or different noise sources (or a magnetic wave source). In various implementations, if one speaker is located in the center of the room and is turned on and tuned to the resonant frequency of the magnets+ flexible connectors of the resonant frequency generators 46, all of the resonant frequency generators 46 may produce a voltage output that is a function of the magnetic field strength and number of windings in the coils used with each magnet. In such implementations, the total voltage output of the system corresponds with the total output of all resonant frequency generators 46 together. In various implementations, the power converter 52 works to rectify or invert the AC voltage from the resonant frequency generators 46 to a DC voltage which can be used to charge battery 54, allowing the output of the battery 54 to drive a load. In other implementations, the output of the power converter 52 may be used to drive the load directly. In some implementations the load may include a resonant frequency oscillator used to drive the speaker 46 and/or the speaker 46 itself.

Figure 5:
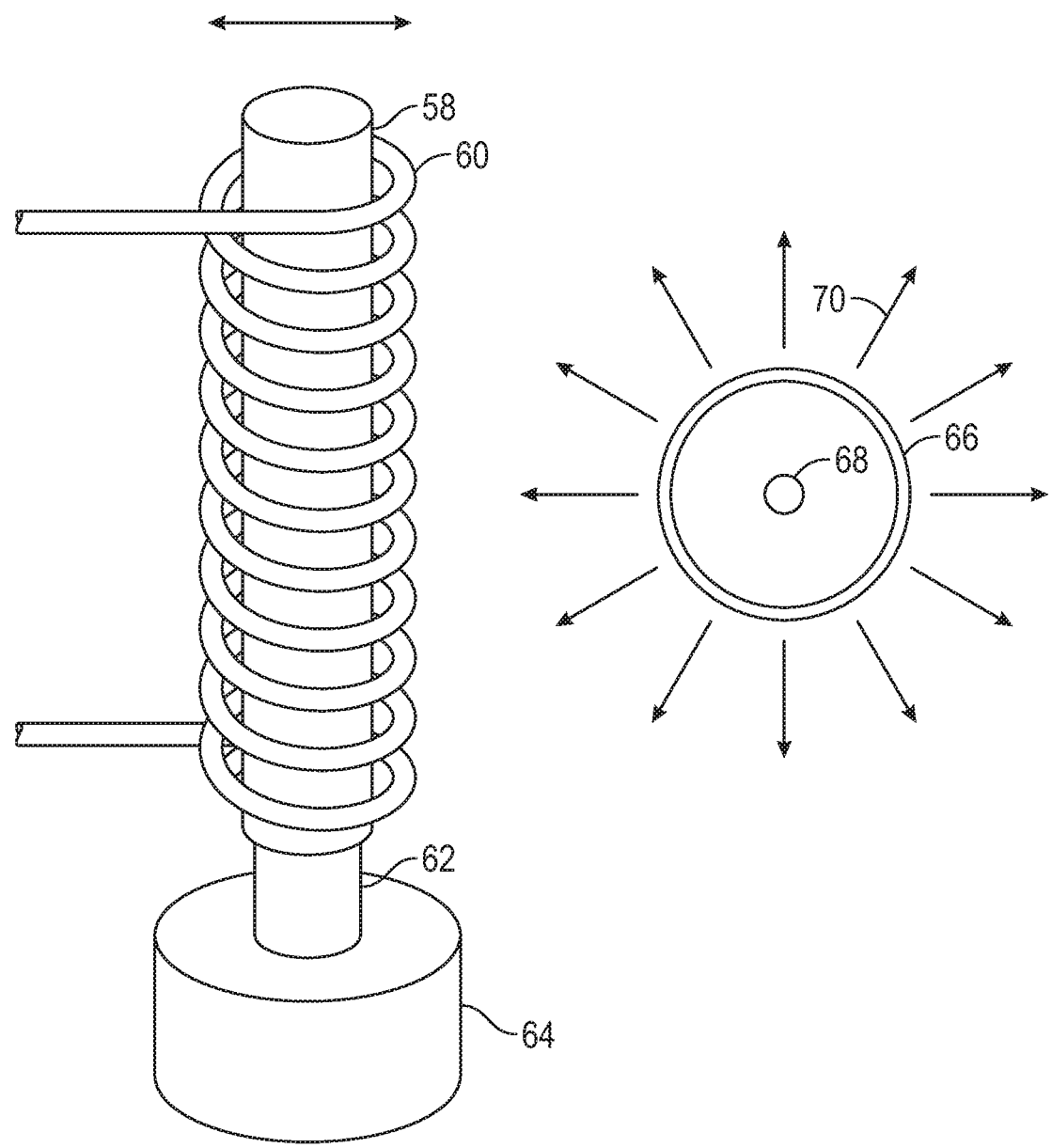
FIG. 5 illustrates an implementation of a power generator with a speaker coil.

Referring to FIG. 5, an implementation of a power generator with a speaker coil is illustrated. As illustrated, a magnet 58 is mounted on a base 64 using a flexible connector 62 similar to the design illustrated in FIG. 3. In various implementations, the magnet 58 may be joined with the base 64 at one end. In various implementations, by non-limiting example, the flexible connector 62 may be any of the material types disclosed in this document. In particular implementations, a rubber section or other flexible material that allows for regular movement of the magnet 58 may be used. In various implementations, however, any of the power generator versions disclosed in this document may be utilized. As illustrated, a coil 60 is disposed on, (wrapped around in this case), the magnet 58. The material of the coil includes an electrically conductive material.

As illustrated, the system includes a speaker that includes a speaker coil 66 that includes a magnet 68. The magnet 68 with the speaker coil 66 during operation uses electricity flowing through the coil to create an electromagnetic effect that generates a magnetic field that varies over time. This time varying magnetic field is illustrated through field lines 70. In various implementations, the magnet 58 and flexible connector 62 are configured to vibrate under the influence of the magnetic field 70, generated by the speaker coil 66. In various implementations, the magnet 68 may be an electromagnet or any other type of magnet disclosed in this document.

In various implementations, the speaker coil 66 and the magnet 68 create a time-varying magnetic field as electric current flows through the speaker coil 66. As the electric current passes through the speaker coil 66, the direction of the magnetic field generated may rapidly change, as the speaker coil's 66 polar orientation reverses, causing the speaker coil 66 and/or magnet 68 to vibrate back and forth (which acts to create the compression waves previously described). In some implementations where the magnet 68 is an electromagnet itself, the variations in electric current supplied to the magnet 68 itself cause the time varying magnetic field, either alone, or in combination with the speaker coil 66. The magnetic field lines 70, interact with magnet 58 and the flexible connector 62. As the time variation of the magnetic field lines 70 reaches a frequency that, when interacting with the magnet 58 induces a resonant vibrational frequency in the magnet/flexible connector system, the magnet 58 begins to vibrate regularly thus generating electrical current in the coil 60 and corresponding electrical power.

In various implementations, the shape of the magnetic field lines 70 of the magnetic field may be, by non-limiting example, linear, planar, spherical, toroidal, or cylindrical, or any other surface/solid shape. As with other implementations disclosed in this document, the vibration of the magnet 58 is used to generate electrical power in combination with the coil 60 as the moving magnetic field lines of the magnet 58 induce corresponding electrical current in the material of the coil 60.

In various implementations, resonant frequency power generators like those illustrated in FIG. 5 may be used in combination with resonant frequency power generators like those disclosed in this document that are powered by compression waves. In this way, electrical power can be generated using both the time varying magnetic field supplied by a speaker and the compression waves supplied by the same speaker. The physical relationship of the various power generators may be determined by the need for closer physical proximity to the speaker coil and/or magnet included in the speaker for those power generators that utilize time varying magnetic field versus those that utilize compression waves. In some power generator implementations, both the time varying magnetic field and compression waves may be utilized by the same power generator in the process of vibrating at a resonant frequency to generate electrical power.

In places where the description above refers to particular implementations of resonant frequency power generators and implementing components, sub-components, methods and sub-methods, it should be readily apparent that a number of modifications may be made without departing from the spirit thereof and that these implementations, implementing components, sub-components, methods and sub-methods may be applied to other resonant frequency power generators.

What is claimed is:

1. A power generator, comprising:
   a base;
   a magnet suspended within the base through one or more flexible connectors; and
   a coil disposed around the magnet;
   wherein the magnet and one or more flexible connectors are configured to vibrate under the influence of a magnetic field generated by a speaker coil; and
   wherein the vibration of the magnet generates electrical power with the coil.

2. The power generator of claim 1, wherein the magnet comprises a bar magnet.

3. The power generator of claim 1, further comprising a Faraday cage enclosing at least the power generator.

4. The power generator of claim 1, further comprising at least one battery electrically connected to the power generator.

5. The power generator of claim 1, wherein magnetic field lines of the magnetic field are oriented linearly or toroidally.

6. The power generator of claim 1, wherein the one or more flexible connectors further comprise rubber, a spring, or an elastic material.

7. The power generator of claim 1, wherein the magnetic field comprises a time varying magnetic field.

8. A power generator system, comprising:
   a frequency oscillator electrically coupled to a transmitter, the transmitter configured to send a frequency of the frequency oscillator to a satellite over a telecommunications channel;
   a receiver configured to receive the frequency over the telecommunications channel from the satellite;
   a speaker coupled with the receiver, the speaker driven by the frequency to produce a time varying magnetic field corresponding with the frequency; and
   a plurality of resonant frequency generators configured to vibrate at a frequency under the influence of the time varying magnetic field from the speaker;
   wherein the plurality of resonant frequency generators are configured to generate an output voltage through the vibration.

9. The system of claim 8, further comprising a Faraday cage enclosing at least the power generator.

10. The system of claim 8, further comprising at least one battery electrically connected to the power generator.

11. The system of claim 8, wherein the time varying magnetic field may be oriented linearly or toroidally.

12. The system of claim 8, further comprising one or more resonant frequency generators configured to generate an input voltage using a compression wave generated by the speaker.

13. A power generator system, comprising:
    a first base and a second base;
    a first magnet coupled to the first base through one or more flexible connectors;
    a second magnet coupled to the second base through one or more flexible connectors; and
    a first coil disposed around the first magnet and a second coil disposed around the second magnet;
    wherein the first magnet and one or more flexible connectors are configured to vibrate at a resonant frequency emitted by a noise source;
    wherein the second magnet and one or more flexible connectors are configured to vibrate under the influence of a magnetic field generated by a speaker coil; and
    wherein the vibration of the first magnet generates electrical power with the first coil and the vibration of the second magnet generates electrical power with the second coil.

14. The system of claim 13, wherein the first magnet and the second magnet each comprises a bar magnet.

15. The system of claim 13, further comprising a Faraday cage enclosing at least the power generator system.

16. The system of claim 13, further comprising at least one battery electrically connected to the power generator system.

17. The system of claim 13, wherein magnetic field lines of the magnetic field are oriented linearly or toroidally.

18. The system of claim 13, wherein the one or more flexible connectors further comprise rubber, a spring, or an elastic material.

19. The system of claim 13, wherein the magnetic field comprises a time varying magnetic field.

20. The system of claim 13, wherein the noise source comprises the speaker coil.

* * * * *